US00RE39601E

(19) United States
(12) Reissued Patent
Svanqvist et al.

(10) Patent Number: US RE39,601 E
(45) Date of Reissued Patent: May 1, 2007

(54) METHOD OF AND A DEVICE FOR TRANSFERRING RUNNING DRIED WEB FROM ONE DEVICE TO A SUBSEQUENT DEVICE

(75) Inventors: Tord O. S. Svanqvist, Karlstad (SE); B. Lennart H. Örtemo, Karlstad (SE)

(73) Assignee: Metso Paper Karlstad AB, Karlstad (SE)

(21) Appl. No.: 09/550,005

(22) Filed: Apr. 14, 2000

Related U.S. Patent Documents

Reissue of:
(64) Patent No.: 5,738,760
Issued: Apr. 14, 1998
Appl. No.: 08/689,468
Filed: Aug. 9, 1996

(30) Foreign Application Priority Data

Sep. 13, 1995 (SE) ..... 9503174

(51) Int. Cl.
*D21H 7/00* (2006.01)
*D21G 9/00* (2006.01)
*B65H 20/00* (2006.01)

(52) U.S. Cl. ..... 162/193; 162/194; 162/289; 162/283; 34/120; 34/114; 34/641; 226/7; 226/97.1

(58) Field of Classification Search ..... 162/193–194, 162/198, 212, 216, 283–284, 289; 34/114, 34/117, 120–122, 461, 640, 641; 226/97.1–97.3, 226/91–92, 7; 242/615.11; 406/88, 92, 98, 406/154, 106
See application file for complete search history.

(56) References Cited

U.S. PATENT DOCUMENTS 2,848,820 A * 8/1958 Wallin et al. ..... 34/461
3,231,165 A * 1/1966 Wallin et al. ..... 242/615.11

(Continued)

FOREIGN PATENT DOCUMENTS

CH 425445 * 5/1967
JP H6-321395 11/1994

OTHER PUBLICATIONS

Hagen et al., *Airfoil Web Dryer Performance Characteristics*, 1984 Coating Conference, pp. 85–97.
Klerelid, Ingvar, *New Dry End Development in Operation: Creping, Coating Control, Reel and Dust Removal*, Sep. 16–17, 1993, pp. 87–104.*

*Primary Examiner*—José A. Fortuna
(74) *Attorney, Agent, or Firm*—Alston & Bird LLP

(57) ABSTRACT

To accomplish a web transfer, which in reliability is comparable to the one obtained with a closed draw, in any operating environment, but especially where it is desirable to transfer a fast running tissue web (4) from the drying section of a tissue machine, e.g., a Yankee dryer (2), to a reel-up (3), a web support device (10) extends across the width of the web (4) and along a predetermined run of the web support device has a support surface (11) formed by a series of plate member assemblies (23) having means for creating a flow of air in the direction of the web run. Between the web (4) and the support surface (11) the flow of air forms an air layer (15) of reduced static pressure, so as to stabilize the web (4) against flutter. The predetermined run may extend through a calender (7) and past scanner equipment (8). Pneumatic tail threading capabilities may be included.

26 Claims, 4 Drawing Sheets

U.S. PATENT DOCUMENTS 3,272,415 A * 9/1966 Wallin et al. ..... 226/97
3,385,490 A * 5/1968 Malmgren et al. ..... 226/7
3,587,177 A 6/1971 Overly et al.
3,650,043 A * 3/1972 Overly et al. ..... 34/643
3,705,676 A 12/1972 Overly et al.
3,775,806 A * 12/1973 Olbrant et al. ..... 15/309.1
3,847,390 A * 11/1974 Dixon ..... 271/195
3,999,696 A * 12/1976 Reba et al. ..... 226/7
4,014,487 A * 3/1977 Reba et al. ..... 226/5
4,034,905 A * 7/1977 Lansmich ..... 226/195
4,147,287 A 4/1979 Reba
4,186,860 A 2/1980 Reba
4,321,107 A * 3/1982 Page ..... 162/198
4,726,502 A 2/1988 Cryderman
4,779,357 A 10/1988 Troetscher
4,881,327 A 11/1989 Hauser et al.
4,904,344 A 2/1990 Peiffer
4,906,333 A * 3/1990 Myren ..... 162/111
4,923,567 A * 5/1990 Liedes et al. ..... 162/193
4,969,588 A 11/1990 Baker
5,022,166 A 6/1991 Nguyen et al.
5,156,312 A * 10/1992 Kurie ..... 242/615.11
5,370,289 A 12/1994 Helms
5,466,298 A 11/1995 Pollock
5,480,086 A * 1/1996 Nakashima et al. ..... 226/97
5,577,294 A 11/1996 Pollock
6,155,518 A * 12/2000 Bannenberg ..... 242/615.11
6,328,852 B1 * 12/2001 McGary et al. ..... 162/199
6,558,514 B2 * 5/2003 Rouhiainen et al. ..... 162/193
2002/0005264 A1 * 1/2002 McGary et al. ..... 162/202

* cited by examiner

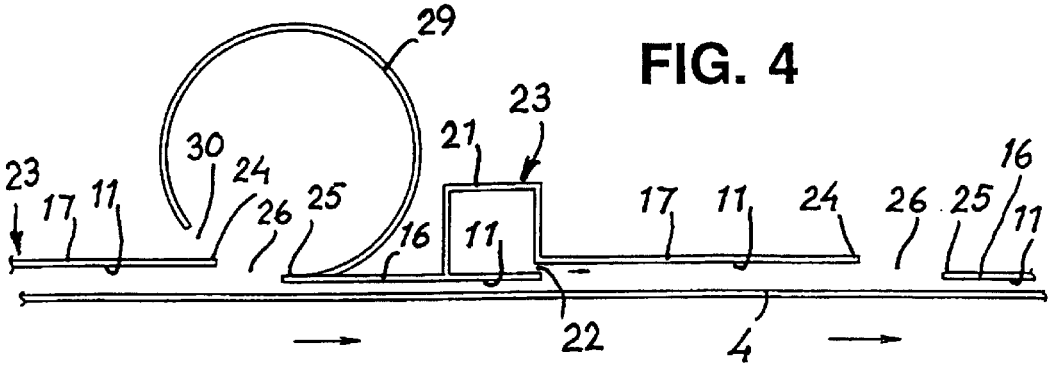
FIG. 4
FIG. 5
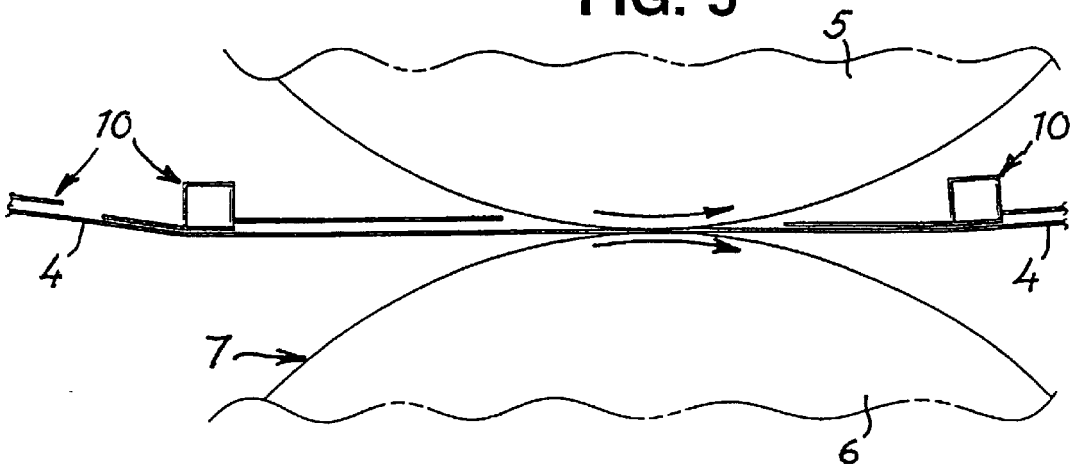
FIG. 9
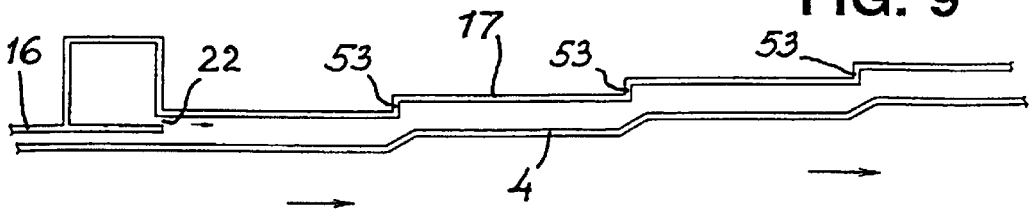

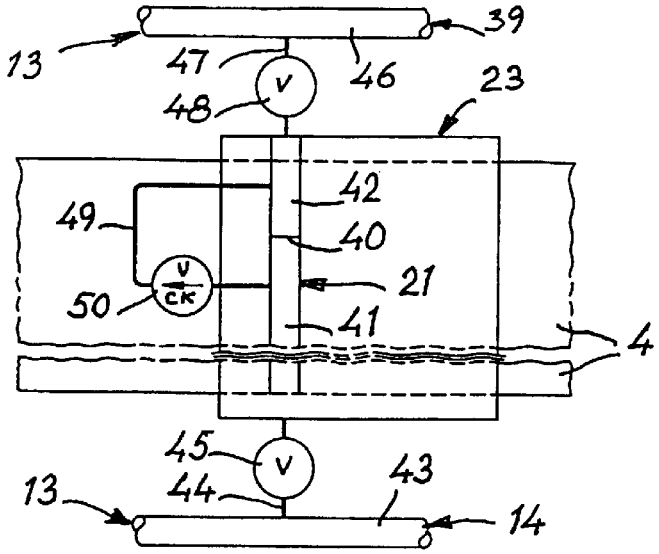
FIG. 7
FIG. 8
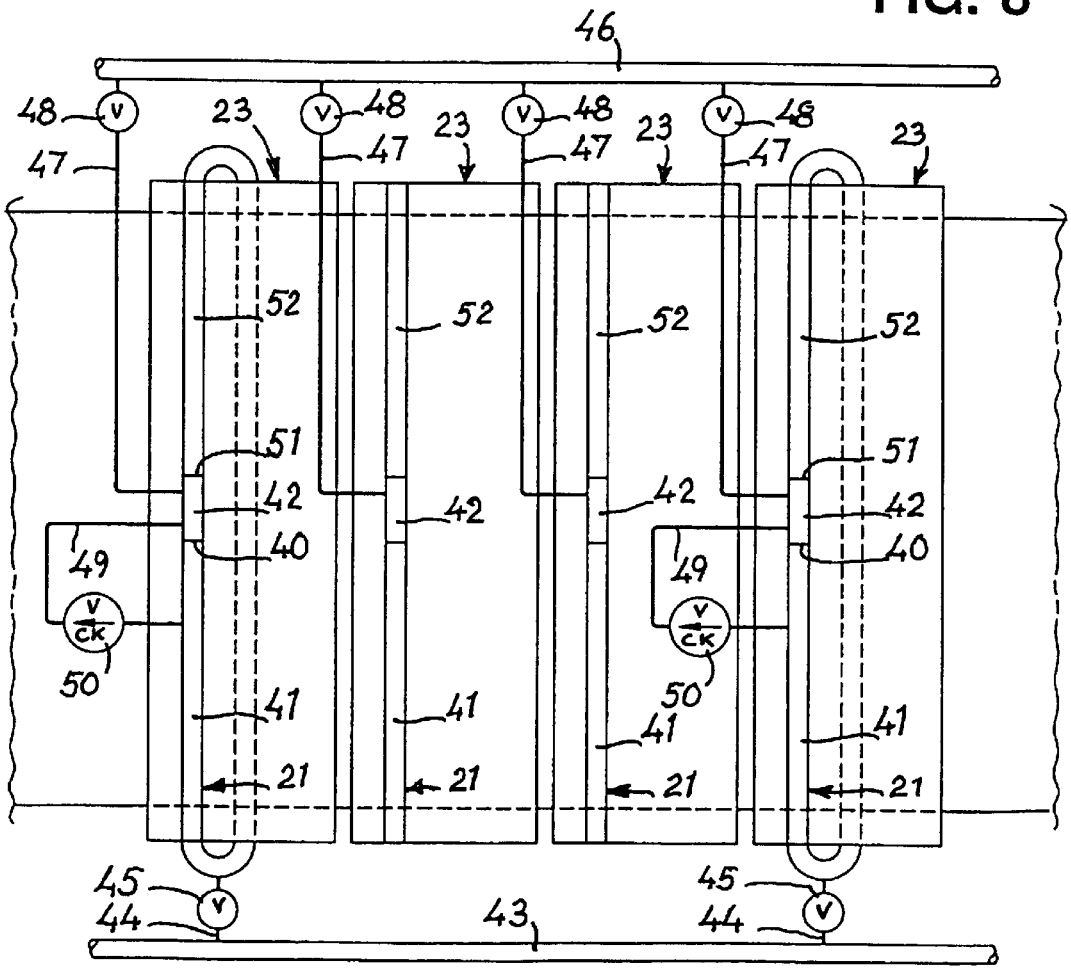

METHOD OF AND A DEVICE FOR TRANSFERRING RUNNING DRIED WEB FROM ONE DEVICE TO A SUBSEQUENT DEVICE

Matter enclosed in heavy brackets [ ] appears in the original patent but forms no part of this reissue specification; matter printed in italics indicates the additions made by reissue.

*This application is a Reissue of U.S. Ser. No. 08/689,468 filed on Aug. 9, 1996, now U.S. Pat. No. 5,738,760.*

FIELD AND BACKGROUND OF THE INVENTION

The present invention relates generally to a method of and an apparatus for transferring a fast running ready-dried fibrous web having two longitudinal edges from one device and along a predetermined run to a subsequent device for performing an act or operation on the web. In a typical installation, the apparatus is installed downstream of a drying section of a papermaking machine, or in association with a rewinder or in a converting plant, for example.

One embodiment of the invention relates specifically to an apparatus for transferring a fast running ready-dried tissue web having two longitudinal edges from a drying section of a tissue paper making machine and along a predetermined run to a reel-up.

In this context, the term "tissue paper" is intended to include any grade of "soft crepe paper" or other paper for sanitary purposes, whether creped or not when used by a consumer.

The performance of a tissue machine is often limited by its dry end. Generally, the difference between a tissue machine with high efficiency and one with low efficiency is mainly caused by the performance of the dry end. In the dry end, several causes may result in web breaks, and the produced web may be partially rejected for unsatisfactory quality. However, with good control of the whole paper making process and use of the latest dry end technology it is possible to run a machine at both high speed and high machine efficiency.

The main factors affecting dry end machine efficiency are lost time with no paper on the reel, and the amount of paper rejected at paper breaks. On most high speed machines the paper web roll is kicked out at a paper break, because it is difficult to make a turn-up on a half size roll, and if the roll is small, the roll is rejected. Having this in mind, the dry end machine efficiency can be split up as follows.

Dry End Machine Efficiency:

Creping blade changes

Paper breaks including rejected paper in kicked out roll

Tail threading failures

Turn-up failures

Dry end cleaning (to avoid web breaks caused by dirt falling down)

Lost process control

Roll top waste and roll bottom waste

Roll bottom waste is caused by the paper web adjacent the reel spool having to be rejected and, similarly, roll top waste relates to the paper lost at the top of the roll during the kick-out phase, and/or by taking samples for testing and/or roll handling after the tissue machine.

In an efficiently operated machine, the threading of a new tail, after creping doctor blade changes and web breaks, does not take more than a few seconds. If the threader is out of adjustment, several minutes can be lost during each attempt to thread. Paper may plug the tail chutes and time consuming cleaning of the whole dry end may be required. The air chute threader is considered the most efficient and safest threader. There, the tail is transferred by compressed air in chutes, substantially as disclosed in U.S. Pat. No. 3,847,390 (Dixon), for example. Pneumatic tail threaders of other than chute type are disclosed in U.S. Pat. Nos. 3,999,696 and 4,014,487 (both Rehn et al.) and 4,923,567 (Liedes et al.).

The tail threaders may be mounted outside of any web stabilizers. Web stabilizers or flutter suppressors are disclosed in U.S. Pat. Nos. 4,321,107 (Page) and 3,650,043 (Overly et al.), for example. The design of the leading edge of a flat sheet stabilizer must be such that the boundary layer of air entrained by the web can escape on the top side of the stabilizer when the stabilizer is located above the predetermined run of the web. To maintain web control and prevent wrinkles, breaks and foldovers, the web tension must oppose the forces from disturbing air currents. Such currents originate from the machine room, the boundary layer of air, and the rotating rolls of the paper machine. The heat convection air flows are another source of disturbing air currents in the dry end.

SUMMARY OF THE INVENTION

The object of the present invention is to increase the dry end machine efficiency, primarily by accomplishing a web transfer, which in respect of reliability is comparable to the one obtained with a closed draw, but which also will offer as improved tail threading.

In accordance with the present invention, this object is achieved by a web transferring method which incorporates the steps of providing a substantially web-wide support surface having an upstream end and a shape conforming to at least a portion of that of the predetermined run, the support surface being located in a position adjacent that of the predetermined run and extending substantially all the way from said one device to the subsequent device, and creating a flow of air in the direction of the web run along the support surface by supplying pressurized air of a first pressure, e.g., from a fan, along a first line across the support surface in a cross machine direction adjacent the upstream end of the support surface and, downstream thereof, along at least one further line across the support surface in a cross machine direction, the flow of air forming between the web and the support surface an air layer of reduced static pressure, so as to stabilize it against flutter.

Similarly, in accordance with the present invention the object is achieved by a web transferring apparatus which incorporates the following features:

A web support device that has a substantially web-wide support surface, which has an upstream end and a shape conforming to at least a portion of that of the predetermined run. The support surface is located in a position adjacent that of the predetermined run and extends substantially all the way from said one device to the subsequent device. In addition, means are provided for creating a flow of air in the direction of the web run along the support surface. These air flow creating means include means for supplying pressurized air of a first pressure along a first line across the support surface in a cross machine direction adjacent the upstream end of the support surface and, downstream thereof, along at least one further line across the support surface in a cross machine direction. Between the web and the support surface the flow of air forms an air layer of reduced static pressure, so as to stabilize the web against flutter.

By the incorporation of the above steps and features, respectively, the number of web breaks downstream of the drying section of the machine (and under unchanged conditions in other respects) will be remarkably reduced and the dry end efficiency will increase. When the number of web breaks at this location sets the limit for the paper production on the machine, the present invention gives an opportunity of increasing the production.

In a preferred embodiment of the invention, the web support device includes a series of consecutive substantially web-wide plate members. Each plate member has a leading edge and a trailing edge. The trailing edge of at least one of the plate members is located spaced from and upstream of the leading edge of an adjacent one of the plate members, so as to form a first slot-shaped gap between the plate members for the passage of air therethrough. The pressurized air supplying means include a pipe member extending along and bridging the first slot-shaped gap, and the pipe member has an elongate passage, e.g., a series of equidistantly spaced identical bores or a longitudinal narrow slit, for discharging the flow of air in the direction of the web run. In addition, the pipe member and the two adjacent plate members constitute in combination a plate member assembly . Such a web support device is cost effective in production and reliable in function.

The apparatus according to the invention is especially suitable for transferring a fast running ready-dried tissue web having two longitudinal edges from a drying section of a tissue paper-making machine and along a predetermined run to a reel-up. In such an apparatus, the object of the invention stated above is achieved in accordance with the present invention by the incorporation of the following features:

A series of consecutive substantially web-wide plate members define a substantially web-wide support surface having an upstream end a shape conforming to at least a portion of that of the predetermined run. The support surface is located in a position adjacent that of the predetermined run and extends substantially all the way from the drying section to the reel-up. Each plate member has a leading edge and a trailing edge. The trailing edge of at least one of the plate members is located spaced from and upstream of the leading edge of an adjacent one of the plate members, so as to form a first slot-shaped gap between the plate members for the passage of air therethrough. Further, means are provided for creating a flow of air in the direction of the web run along the support surface. The air flow creating means include means for supplying pressurized air of a first pressure over the width of the web adjacent the upstream end of the support surface and, downstream thereof, through the first slot-shaped gap formed between the plate members. The pressurized air supplying means include a pipe member that extends along and bridges the first slot-shaped gap, and the pipe member has an elongate passage, such as a series of equidistantly spaced identical bores or a longitudinal narrow slit, for discharging the flow of air in the direction of the web run. The pipe member and the two adjacent plate members constitute in combination a plate member assembly, and the flow of air forms between the web and the support surface an air layer of reduced static pressure, so as to stabilize the web against flutter.

By the incorporation of the above features, the number of web breaks in the area between the drying section of the machine and the reel-up (and under unchanged condition in other respects) will be remarkably reduced and the dry end efficiency will increase. When the number of web breaks in this area sets the limit for the paper production on the machine, the present invention gives an opportunity of increasing the production. In addition, the apparatus is cost effective in production and reliable in function.

Preferably, the apparatus includes a plurality of plate member assemblies, and each assembly has an upstream edge and a downstream edge. The downstream edge of one assembly is located spaced from and upstream of the upstream edge of an adjacent assembly so as to form a second slot-shaped gap between the assemblies for the passage of air therethrough. By permitting some air to pass through the second slot-shaped gap, it will be possible *to* maintain optimum web transfer conditions by supplying additional air through the pipe member of the subsequent plate member assembly.

In a tissue machine, the drying section includes a yankee dryer, from which the web is creped off by means of a creping blade to form a creped web. Then, the substantially web-wide support surface suitably starts at the creping blade to reduce the number of error possibilities.

During a creping operation, dust is released from the tissue web, and a major portion of the dust is entrained by the fast running web and the associated boundary layers. Due to the hazards and inconvenience caused by the dust, it is recommendable to provide means for removing a suspension of dust in air passing through the second slot-shaped gap. To make an air flow of a suitable size pass through the second slot-shaped gap, we chose to locate the downstream edge of the plate member assembly at a slightly larger distance from the predetermined run of the web than the distance from the upstream edge of the adjacent plate member assembly to the predetermined run of the web.

Preferably, the plate members of each plate member assembly are substantially planar, and a plate member in the assembly forms an angle of at most a few degrees with an adjacent plate member. Thereby, the plate member assemblies are easy to manufacture, and abrupt turns that are error possibilities are avoided.

Often, a calender having a nip for calendering the web is provided downstream of the drying section but upstream of the subsequent device. To achieve a safe web transfer through the calender, it is preferred that the web support device has trailing end immediately upstream of the calender nip and a new leading end immediately downstream of the calender nip.

As a rule, also scanner equipment for scanning at least one physical property of the web is provided downstream of the drying section but upstream of the subsequent device. Conventional scanner equipment has a frame with a central opening for the passage therethrough of the web, a scanner unit for scanning the physical property, which unit is carried by the frame and is movable back and forth across the web from one longitudinal web edge to the other. However, in order to achieve an equivalent to what might be termed a "closed draw" web transfer through the scanner equipment, we provide a device associated with the scanner unit for forming a surface supporting the web at locations between the scanner unit and the two longitudinal web edges during the passage of the web through the opening, and the web supporting surface of the scanner equipment has an upstream edge and a downstream edge. Further, immediately upstream of the scanner equipment the web support device has a trailing end, which is overlapped by the upstream edge of the scanner equipment the web supporting surface, and immediately downstream of the scanner equipment the web support device has a new leading end, which overlaps the downstream edge of the scanner equipment web supporting surface. The scanner equipment with the web support device is the subject matter of a patent application entitled "Scanning device for scanning a physical property of a fibrous web" filed concurrently herewith by the same applicant.

BRIEF DESCRIPTION OF THE DRAWINGS

FIG. 4 is an enlarged fragmentary side elevational view of a running tissue web supported by plate member assemblies that are spaced from one another by a slot-shaped gap, one of the assemblies having at its upstream end means for removing a suspension of dust in air passing through the slot-shaped gap.

FIG. 5 is an enlarged fragmentary side elevational view of a running tissue web that passes through the calender nip shown in FIG. 1 and is supported by plate members assemblies immediately upstream and downstream of the nip.

FIG. 7 is a schematic plan view of a plate member assembly and associated equipment designed to facilitate tail threading along one side of the assembly.

FIG. 8 is a schematic plan view of a series of plate member assemblies and associated equipment designed to facilitate the threading of a center tail.

FIG. 9 is an enlarged fragmentary side elevational view of a running tissue web supported by an alternative plate member assembly wherein the trailing plate member is extended and stepped.

DETAILED DESCRIPTION OF THE ILLUSTRATED EMBODIMENTS

Figure 1:
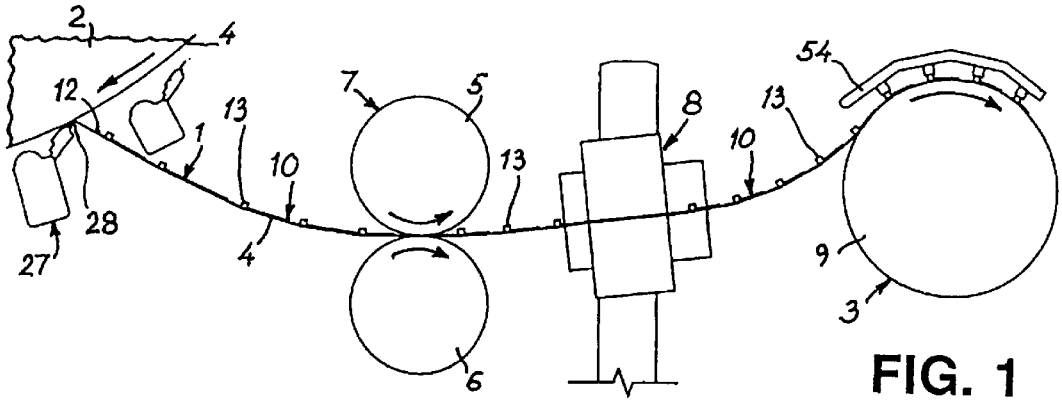
FIG. 1 is a simplified schematic side elevational view of the dry end of a tissue paper making machine provided with a preferred embodiment of an apparatus in accordance with the present invention for transferring a tissue paper web from a yankee dryer through a calender and past scanning equipment to a reel-up.
Figure 2:
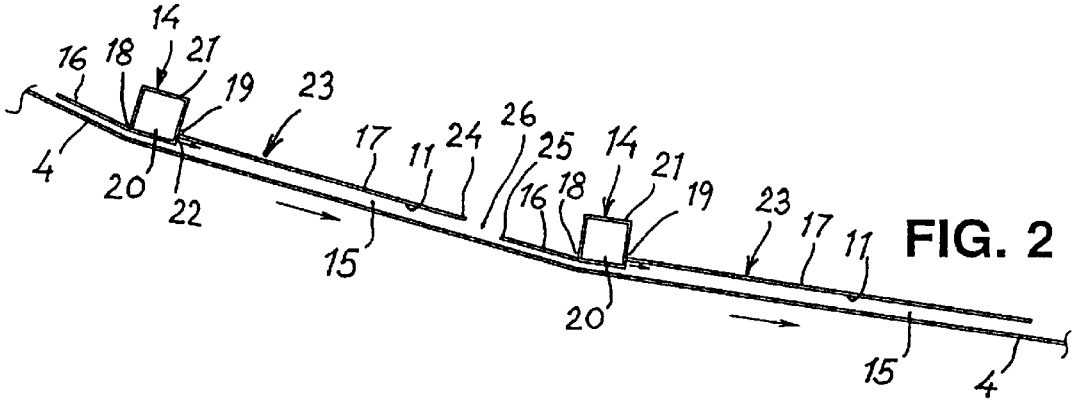
FIG. 2 is an enlarged fragmentary side elevational view of a running tissue web supported by two plate member assemblies used in the web transferring apparatus of FIG. 1.
Figure 3:
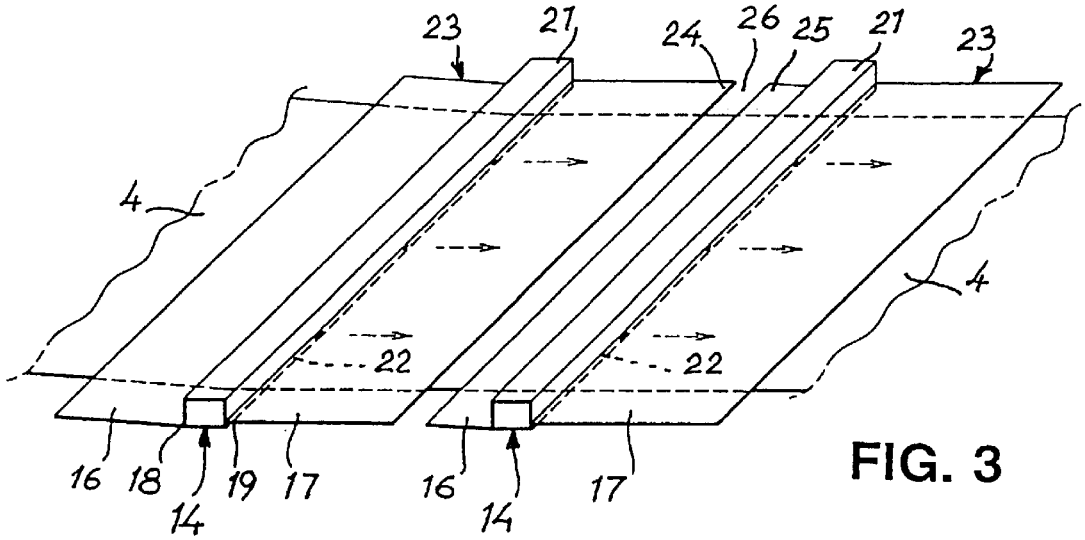
FIG. 3 is a perspective view of the web and the plate member assemblies shown in FIG. 2.

Referring now to FIGS. 1, 2 and 3, one form of apparatus incorporating the teachings of the present invention is illustrated. The apparatus is generally designated by reference numeral 1 and for purposes of illustration is shown as being disposed between a yankee dryer 2 and a reel-up 3 of a conventional tissue papermaking machine. It will be appreciated, however, that the apparatus and method of the present invention may be effectively utilized in any operating environment wherein it is desirable to transfer a fast running ready-dried fibrous web from one device and along a predetermined run to a subsequent device for performing an act or operation on the web, as for example during the processing of the web in rewinder or in a converting plant. In the illustrated operating environment, apparatus 1 transfers the tissue web 4 from yankee dryer 2, through a nip formed between two rolls 5 and 6 of a calender 7, and past scanner equipment 8 to reel-up 3, which in the illustrated embodiment is a drum reel-up having a drum 9 that supports and drives the reel spool, not shown, on which the web is being wound. Of course, neither calender 7 nor scanner equipment 8 form any part of apparatus 1.

In accordance with the present invention, apparatus 1 comprises a web support device 10 that has a substantially web-wide support surface 11, which has an upstream end 12 and a shape conforming to at least a portion of that of the predetermined run. The support surface 11 is located in a position adjacent that of the predetermined run and extends substantially all the way from one device for performing an act or operation on the web, e.g., the drying section of a papermaking machine, to a subsequent device, e.g., reel-up 3. In the illustrated embodiment, the drying section is represented by yankee dryer 2, but a yankee dryer does not have to be included in the drying section. Further, apparatus 1 comprises means 13 for creating a flow of air in the direction of the web run along the support surface 11. These air flow creating means 13 include means 14 for supplying pressurized air of a first pressure along a first line (at 20) across the support surface 11 in a cross machine direction adjacent the upstream end 12 of the support surface 11 and, downstream thereof, along at least one further line across the support surface 11 in a cross machine direction. The means 14 for supplying pressurized air of the first pressure may include any suitable source of pressurized air, such as a fan, blower or other device, not shown, which can deliver air of an absolute pressure in the range of about 120 kilopascals. Between the web 4 and the support surface 11 the flow of air forms an air layer 15 of reduced static pressure, so as to stabilize web 4 against flutter. Although the support surface 11 can be located either above or below the predetermined web run, the handling of possible broke will be facilitated if the support surface is located above the predetermined web run.

In a preferred embodiment of the invention, web support device 10 includes a series of consecutive substantially web-wide plate members 16 and 17. Each plate member has a leading edge and a trailing edge. The trailing edge 18 of at least one of the plate members, in the shown embodiment plate member 16, is located spaced from and upstream of the leading edge 19 of an adjacent one of the plate members, in the shown embodiment plate member 17, so as to form a first slot-shaped gap 20 between the plate members for the passage of air therethrough. The pressurized air supplying means 14 additionally include a suitable air duct associated with the source of pressurized air, such as pipe member 21 extending along and bridging the first slot-shaped gap 20, and the pipe member 21 has an elongated passage 22, e.g., a series of equidistantly spaced identical bores or a longitudinal narrow slit, for discharging the flow of air in the direction of the web run. In addition, the pipe member 21 and the two adjacent plate members 16 and 17 constitute in combination a plate member assembly 23. Such a web support device 10 is cost effective in production and reliable in function.

The apparatus 1 preferably includes a plurality of plate member assemblies 23, and each assembly has an upstream edge and a downstream edge. The downstream edge 24 of one assembly is located spaced from and upstream of the upstream edge 25 of an adjacent assembly so as to form a second slot-shaped gap 26 between the assemblies for the passage of air therethrough. By permitting some air to leave through the second slot-shaped gap 26, it will be possible *to* maintain optimum web transfer conditions by supplying additional air through the pipe member 21 of the subsequent plate member assembly 23.

In the embodiment shown in FIG. 1, the drying section includes a yankee dryer 2, from which the web is creped off by means of a creping doctor 27 having a doctor blade 28 to form a creped web 4. To reduce the number of error possibilities, the substantially web-wide support surface 11 suitably starts at the doctor blade 28.

During a creping operation, dust is released from the tissue web 4, and a major portion of the dust is entrained by the fast running web 4 and the associated boundary layers. Due to the hazards and inconveniences caused by the dust, it is recommendable to provide means, such as the illustrated round tube 29 for removing a suspension of dust in air leaving through the second slot-shaped gap 26, as shown in FIG. 4. To make an air flow of a suitable size leave through the second slot-shaped gap 26, we chose to locate the downstream edge 24 of the plate member assembly 23 at a slightly larger distance from the predetermined run of the web 4 than the distance from the upstream edge 25 of the adjacent plate member assembly to the predetermined run of the web 4. In the embodiment shown in FIG. 4, the dust removing means include a round tube 29 of comparatively large diameter and having a relatively wide longitudinal slot 30. As shown, the tube 29 is mounted with one of its slot edges at the upstream edge 25 of one of the plate member assemblies 23, and with its other slot edge located substantially at the downstream edge 24 of the preceding plate member assembly but spaced outward therefrom, so as to create a gap through which environmental air can be sucked into the tube 29. Suction in the tube 29 may be created by means of a fan, not shown, and the size of the gap is such that the dust velocity in the tube 29 will exceed a critical minimum, below which dust will settle on the bottom of the tube 29.

As is best shown in FIG. 2, the plate members 16 and 17 of each plate member assembly 23 preferably are substantially planar, and a plate member 16 in the assembly 23 forms an angle of at most a few degrees with an adjacent plate member 17. Thereby, the plate member assemblies 23 are easy to manufacture, and abrupt turns that are error possibilities are avoided. Further, the pipe member 21 is of square cross section, and it is preferred to provide the plate members 16 and 17 with a flange each, not shown, that are secured to the two opposed vertical sides of the square pipe member 21 by means of screws, likewise not shown. The elongate passage 22, which is formed by a series of equidistantly spaced identical bores or a longitudinal narrow slit for discharging the flow of air in the direction of the web run, is located in the downstream edge 25 of the plate member assembly 23 with a rounded nose flange-like projection, not shown, extending away from the web 4 to guide the air flows so as to reduce the risks of the web 4 hooking on to the upstream edge 25.

When, as illustrated in FIG. 1, a calender 7 having two calender rolls 5 and 6 defining a nip for calendering the web 4 is provided between the yankee dryer 2 and the reel-up 3, a safe web transfer through the calender 7 can be achieved if, as shown in FIG. 5, the web support device 10 has a trailing end immediately upstream of the calender nip and a new leading end immediately downstream of the calender nip.

Figure 6:
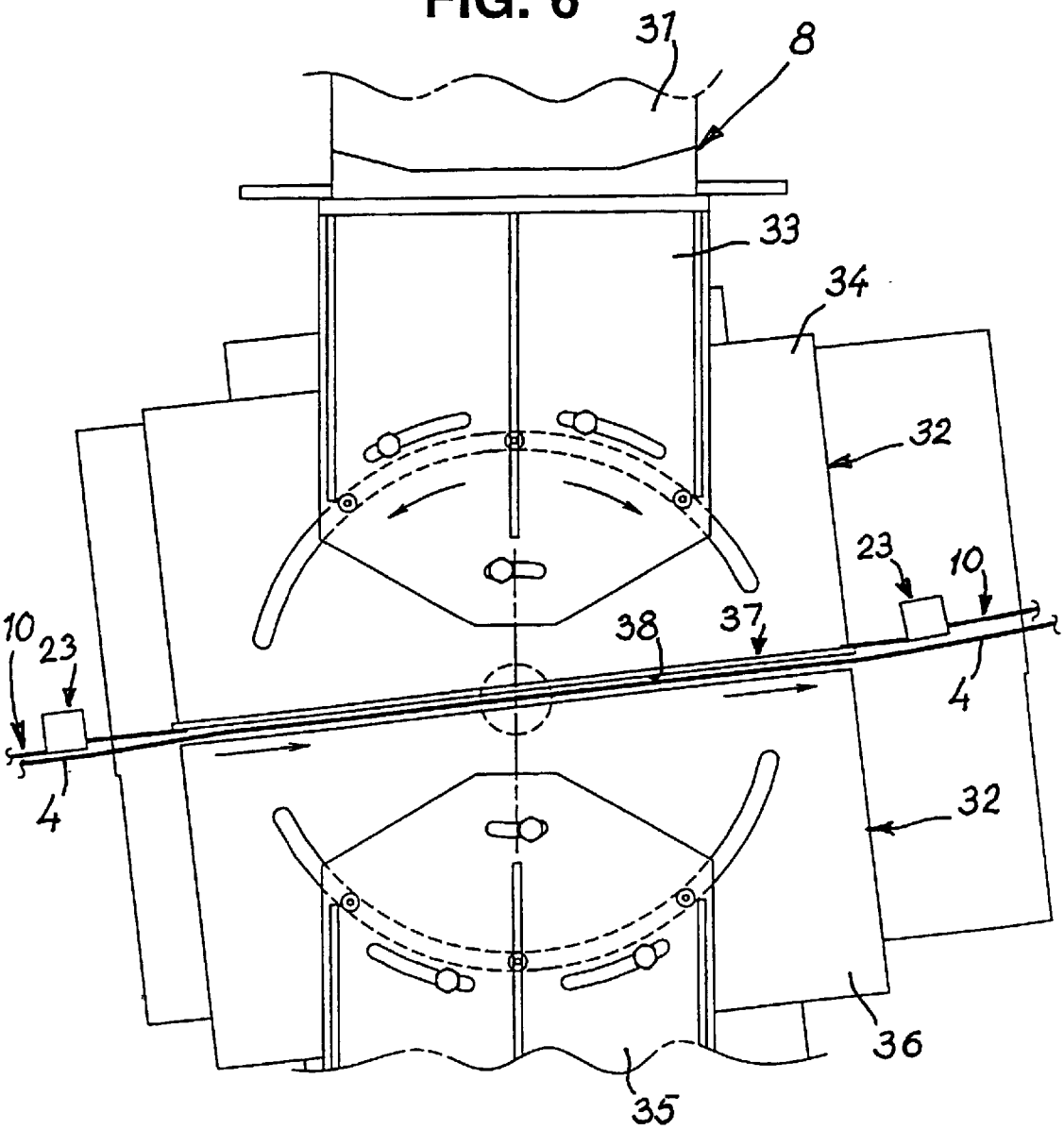
FIG. 6 is an enlarged fragmentary sectional view of a running tissue web that passes through the scanning equipment shown in FIG. 1 and is supported by plate member assemblies overlapping a web supporting surface provided in the scanning equipment.

As also illustrated in FIG. 1, scanner equipment 8 for scanning at least one physical property of the web 4 may be provided between the calender 7 and the reel-up 3. As shown in FIG. 6, conventional scanner equipment includes a frame 31, which may be a box beam frame of rectangular shape, so that the frame 31 has a central opening for the passage therethrough of the web 4. Further, conventional scanner equipment includes a scanner unit 32 for scanning the physical property. The scanner unit 32 is carried by the frame 31 and is movable back and forth across the web 4 from one longitudinal web edge to the other. In the illustrated embodiment the scanner unit 32 can be inclined about +/−30° relative to a horizontal plane, so that it can be adjusted to any substantially horizontal web run. The scanner unit 32 includes an upper carriage 33 carrying a first scanner head 34, and a lower carriage 35 carrying a second scanner head 36. Each scanner head may be provided with different sensors, not shown, for sensing different properties, such as basis weight, moisture etc.

In order to achieve an equivalent to what might be termed a "closed draw" web transfer through the scanner equipment 8, we provide a device 37 associated with the scanner unit 32 for forming a surface 38 supporting the web 4 at locations between the scanner unit 32 and the two longitudinal web edges during the passage of the web 4 through the opening. The web supporting surface 38 of the scanner equipment 8 has an upstream edge and a downstream edge. Further, immediately upstream of the scanner equipment 8 the web support device 10 (or the adjacent plate member assembly 23) has a trailing end, which is overlapped by the upstream edge of the scanner equipment web supporting surface 38, and immediately downstream of the scanner equipment 8 the web support device 10 (or the adjacent plate member assembly 23) has a new leading end, which overlaps the downstream edge of the scanner equipment web supporting surface 38. The scanner equipment 8 with the web support device 37 is the subject matter of a patent application entitled "Scanning device for scanning a physical property of a fibrous web" filed concurrently herewith and assigned to the assignee of the present application.

As an illustrative, but not shown, example of the device 37 forming the web support surface 38 we can mention an extensible and retractable arrangement of lamellae or plates mounted to cover both of the two areas bounded laterally by the laterally reciprocating scanner unit and the frame and longitudinally by the plate member assemblies that are located immediately upstream and downstream of the scanning equipment. Another possibility would be a belt fixed to the scanner unit and having its ends fixed to and coiled upon two rolls carried by the frame laterally outside of the web. This is the embodiment illustrated in FIG. 6. When the scanner unit moves laterally, the belt is uncoiled from one of the rolls and coiled on the other one. A third possibility would be to fix the ends of the belt to the frame and to provide belt guide rolls at the scanner unit to temporarily deflect the run of the belt above, or below, the scanner unit. Further possibilities are described in the simultaneously filed patent application mentioned above.

With reference to FIGS. 7 and 8, in addition to the means 14 for supplying pressurized air of the first pressure for the forming of the web flutter suppressing air layer 15 between the web 4 and the web support surface 11, the air flow creating means 13 suitably further includes means 39 for supplying pressurized air of a second pressure, higher than the first pressure, at a plurality of locations along the web support surface 11, so as to pneumatically convey a paper tail, formed by slitting of the web, from the yankee dryer 2 to the reel-up 3. The means 39 for supplying pressurized air of the second pressure may include a compressor, not shown, which can supply air of an absolute pressure in the range of about 150 to about 200 kilopascals. In a tissue machine having a yankee dryer, the tail cutter mostly is placed on the tender side of the machine and includes a nozzle, which usually is activated outside the tissue web and moved in over the web to create a free tail having a wedge-shaped leading end. However, when the present invention is applied in small width tissue paper machines it is, as a rule, possible to dispense with the tail cutting and to carry out the "tail" threading with a full width tissue web. Therefore, in the present context, the term "tail" is to be interpreted as including also a full width tissue paper web, provided that the web width is no more than at most three meters, preferably no more than about two and a half meters.

FIG. 7 shows a plate member assembly 23, in which the square pipe member 21 has a first partition 40 that divides it lengthwise into a first portion 41 and a second portion 42. The means 14 for supplying pressurized air of the first pressure is shown as including a first manifold pipe 43, which is connected to the first portion 41 of square pipe member 21 by means of a first branch pipe 44 having a first valve 45. The means 39 for supplying pressurized air of the second pressure is shown as including a second manifold pipe 46, which is connected to the second portion 42 of the square pipe member 21 by means of a second branch pipe 47 having a second valve 48. A conduit 49 having a check valve 50 provides fluid communication between the first portion 41 and the second portion 42 of the square pipe member 21 and permits air of the low first pressure to pass from the first portion 41 into the second portion 42 but prevents flow of air of the high second pressure in the opposite direction. The conduit 49 with the check valve 50 are shown as separate components but they may, of course, be integrated with the first partition 40.

In normal operation, air of the low first pressure, usually about 120 kilopascals, is supplied from the first manifold pipe 43 through the first branch pipe 44 with the first valve 45 to the first portion 41 of the square pipe member 21, and from there through the conduit 49 with the check valve 50 to the second portion 42 of the square pipe member 21 while the second valve 48 is closed. For tail threading, air of the high second pressure, usually about 150 to 200 kilopascals, is admitted to the second portion 42 of the square pipe member 21 by opening the second valve 48. When air of the high second pressure starts flowing through the check valve 50 it will cause the check valve to close, so that the high second pressure will be confined to the second portion 42 of the square pipe member 21. At the high second pressure mentioned above, the flow of air discharged through the elongate passage 22 in the square pipe member 21 will have an exit velocity on the order of 50 meters per second. When tail threading is carried out on a narrow full width web, the first partition 40, the conduit 49 and the check valve 50 may be dispensed with, but if desired the first valve 45 may be a check valve.

FIG. 8 shows a series of four plate member assemblies 23 and associated means for supplying air of a first and a second pressure. The first one and the last one of the shown assemblies differ from the one shown in FIG. 7 only in that the square pipe member 21 has also a second partition 51, so that the square pipe member 21 is divided lengthwise into a first portion 41 at one web edge, a central second portion 42, and a third portion 52 at the other web edge. The first branch pipe 44 with the first valve 45 is connected to both of the first portion 41 and the third portion 52 of the square pipe member 21, while the second branch pipe 47 with the second valve 48 and the conduit 49 with the check valve 50 are connected to the second portion 42 as before. Of the four plate member assemblies shown, the two middle ones are not connected to the first manifold pipe 43, which supplies air of the low first pressure to create the flutter suppressing air layer 15, they are connected only to the second manifold pipe 46, which supplies air of the high second pressure to be used for tail threading. In the embodiment illustrated in FIG. 8, air of the high second pressure is supplied to the central second portion 42 of all of the square pipe members 21 during tail threading, while during ordinary operation air of the low first pressure is supplied only to every third square pipe member 21. Naturally, the number of middle plate member assemblies may vary dependent on the circumstances in the specific installation, but during ordinary operation it is not necessary to supply air for flutter suppression as frequently along the predetermined run of the web as air for tail threading has to be supplied.

When the reel-up 3 has a support drum 9 like in the embodiment illustrated in FIG. 1, it is suitable to mount the most downstream ones of the plate member assemblies arcuately along a top portion of the cylinder surface of the drum 9 and to make them of a reduced size in the cross machine direction, so as to dispense with substantially all flutter suppression capability (which actually is not needed in this position) while retaining the tail threading capability. Then, the reduced size plate member assemblies preferably are mounted on a support member 54 having an upstream end, which member is mounted to be pivotable around at its upstream end, so that the reduced size plate member assemblies can be swung away in order not to prevent a new reel spool, not shown, from being lowered onto the drum 9.

As illustrated in FIG. 9, to reduce the air consumption at least one of the plate members 16 and 17 may have at least one transverse step 53 of a height of about a few millimeters, so as to cause a sudden increase in a distance from the predetermined run of the web 4 to the plate member as the web 4 runs from the drying section 2 to the subsequent equipment 3. Of course, if desired, it is also possible to provide a series of equidistantly spaced identical bores, not shown, like those forming the elongate passage 22 in the square pipe member 21, in the vertical portion of said at least one transverse step 53.

While the present invention above has been described with reference to the drawings, several obvious modifications thereof are possible within the scope of the appended claims. As an illustrative example, it would be possible to use plate members 16 and 17 which, instead of being planar, are slightly curved in the running direction of the web 4 and thereby would be more rigid. It would also be possible to substitute another type of dust remover for the round tube 29, e.g., a suitable one of those disclosed in U.S. Pat. No. 4,906,333 (Myren).

That which is claimed is:

1. A method of transferring a fast running *and essentially endless* ready-dried fibrous web having two longitudinal edges from one device and along a predetermined run to a subsequent device for performing an act or operation on the web, which comprises:

(a) providing a substantially web-wide surface having an upstream end and a shape conforming to at least a portion of that of the predetermined run, the substantially web-wide surface being located in a position adjacent that of the predetermined run and extending substantially all the way from said one device to the subsequent device and facing a surface of said web; and (b) creating a flow of air in the direction of the web run and only in the direction of the web run along the substantially web-wide surface by supplying pressurized air of a first pressure along a first line across the substantially web-wide surface in a cross machine direction *adjacent the upstream end of the substantially*

*web-wide surface and by supplying pressurized air, downstream thereof, along at least one further line across the substantially web-wide surface in a cross machine direction*, the flow of air forming [-] between the web and the substantially web-wide surface an air layer of reduced static pressure, so as to stabilize the web against flutter *and help transfer the web from one device to a subsequent device for performing an act or operation on the web.*

2. An apparatus for transferring a fast running *and essentially endless* ready-dried fibrous web having two longitudinal edges from one device and along a predetermined run to a subsequent device for performing an act or operation on the web, which comprises:

(a) a web transfer device having a substantially web-wide surface having an upstream end and a shape conforming to at least a portion of that of the predetermined run, the substantially web-wide surface being located in a position adjacent that of the predetermined run and extending substantially all the way from said one device to the subsequent device and facing a surface of said web; and (b) means for creating a flow of air in the direction of the web run and only in the direction of the web run along the substantially web-wide surface, the air flow creating means including means for supplying pressurized air of a first pressure along a first line across the substantially web-wide surface in a cross machine direction adjacent the upstream end of the substantially web-wide surface and *for supplying pressurized air*, downstream thereof, along at least one further line across the substantially web-wide surface in a cross machine direction, the flow of air forming between the web and the substantially web-wide surface an air layer or reduced static pressure, so as to stabilize the web against flutter.

3. An apparatus as claimed in claim 2, wherein (a) scanner equipment for scanning at least one physical property of the web is provided downstream of the drying section but upstream of the subsequent device, said scanner equipment having:

(aa) a frame with a central opening for the passage therethrough of the web;

(ab) a scanner unit for scanning the physical property, which unit is carried by the frame and is movable back and forth across the web from one longitudinal web edge to the other; and (ac) a device associated with the scanner unit for forming a surface supporting the web at locations between the scanner unit and the two longitudinal web edges during the passage of the web through the opening;

(ad) the web supporting surface of the scanner equipment has an upstream edge and a downstream edge;

and wherein (b) immediately upstream of the scanner equipment the web transfer device has a trailing end, which is overlapped by the upstream edge of the scanner equipment web supporting surface, and immediately downstream of the scanner equipment the web transfer device has a new leading end, which overlaps the downstream edge of the scanner equipment web supporting surface.

4. An apparatus as claimed in claim 2, wherein the air flow creating means further includes means for supplying pressurized air of a second pressure, higher than the first pressure, at a plurality of locations along the web surface so as to pneumatically convey a paper tail, formed by slitting of the web, from the drying section to the subsequent device.

5. An apparatus as claimed in claim 2, including a calender having a nip for calendering the web provided downstream of the drying section but upstream of the subsequent device, and wherein the web transfer device has a trailing end immediately upstream of the calender nip and a new leading end immediately downstream of the calender nip.

6. An apparatus as claimed in claim 2, wherein the web transfer device includes a series of consecutive substantially web-wide plate members, each plate member having a leading edge and a trailing edge, the trailing edge of at least one of the plate members being located spaced from and upstream of the leading edge of an adjacent one of the plate members so as to form a first slot-shaped gap between the plate members for the passage of air therethrough, the pressurized air supplying means including a pipe member extending along and bridging the first slot-shaped gap, the pipe member having an elongate passage for discharging the flow of air in the direction of the web run, the pipe member and the two adjacent plate members constituting in combination a plate member assembly.

7. An apparatus as claimed in claim 6, wherein the plate members of each plate member assembly are substantially planar, and wherein a plate member in the assembly forms an [acute] *obtuse* angle with an adjacent plate member.

8. An apparatus as claimed in claim 6, wherein at least one of the plate members has at least one transverse step so as to cause a sudden increase in a distance from the predetermined run of the web to the plate member as the web runs from the drying section to the subsequent device.

9. An apparatus for transferring a fast running *and essentially endless* ready-dried tissue web having two longitudinal edges from a drying section of a tissue paper making machine and along a predetermined run to a reel-up, which comprises:

(a) a series of consecutive substantially web-wide plate members defining a substantially web-wide surface having an upstream end and a shape conforming to at least a portion of that of the predetermined run, the substantially web-wide surface being located in a position adjacent that of the predetermined run and extending substantially all the way from the drying section to the reel-up and facing a surface of said web, each plate member having a leading edge and a trailing edge, the trailing edge of at least one of the plate members being located spaced from and upstream of the leading edge of an adjacent one of the plate members so as to form a first slot-shaped gap between the plate members for the passage of air therethrough; and (b) means for creating a flow of air in the direction of the web run along the substantially web-wide surface, the air flow creating means includes means for supplying pressurized air of a first pressure over the width of the web adjacent the upstream end of the substantially web-wide surface and, downstream thereof, through the first slot-shaped gap formed between the plate members, the pressurized air supplying means including a pipe member *extending* along and bridging the first slot-shaped gap, the pipe member having an elongate passage for discharging the flow of air in the direction of the web run, the pipe member and the two adjacent plate members constituting in combination a plate member assembly, the flow of air forming between the web and the substantially web-wide surface an air layer of reduced static pressure, so as to stabilize the web against flutter.

10. An apparatus as claimed in claim 9, including a plurality of plate member assemblies, each assembly having an upstream edge and a downstream edge, the downstream edge of one assembly being located spaced from and upstream of the upstream edge of an adjacent assembly so as to form a second slot-shaped gap between the assemblies for the passage of air therethrough.

11. An apparatus as claimed in claim 10, wherein the drying section includes a Yankee dryer, from which the web is creped off by means of a creping blade to form a creped web, and the substantially web-wide surface starts at the creping blade.

12. An apparatus as claimed in claim 10, wherein means are provided for removing a suspension of dust in air passing through the second slot-shaped gap.

13. An apparatus as claimed in claim 12, wherein the downstream edge of the plate member assembly is located at a larger distance from the predetermined run of the web than the distance from the upstream edge of the adjacent plate member assembly to the predetermined run of the web.

*14. A method of transferring an essentially endless ready-dried fibrous web from one device and along a predetermined run to a subsequent device for performing an act or operation on the web, which comprises:*

*(a) providing a substantially web-wide surface having an upstream end and a shape conforming to at least a portion of that of the predetermined run, the substantially web-wide surface being located in a position adjacent that of the predetermined run and extending substantially all the way from one device to the subsequent device and facing a surface of the web; and*

*(b) creating a flow of air that flows substantially in the downstream direction of the web run and the substantially web-wide surface by supplying pressurized air along a first line across the substantially web-wide surface in a cross machine direction and by supplying pressurized air, downstream thereof, along at least one further line across the substantially web-wide surface in a cross machine direction, the flow of air forming between the web and the substantially web-wide surface an air layer of reduced static pressure, so as to stabilize the web against flutter and help transfer the web from one device to a subsequent device for performing an act or operation on the web.*

*15. An apparatus for transferring an essentially endless ready-dried fibrous web from one device and along a predetermined run to a subsequent device for performing an act or operation on the web, which comprises:*

*(a) a web transfer device having a substantially web-wide surface having an upstream end and a shape conforming to at least a portion of that of the predetermined run, the substantially web-wide surface being located in a position adjacent that of the predetermined run and extending substantially all the way from one device to the subsequent device and facing a surface of the web; and*

*(b) a pressurized air supply for creating a flow of air that flows substantially in the downstream direction of the web run and the substantially web-wide surface, said pressurized air supply including at least one pipe member and supplying pressurized air along a first line across the substantially web-wide surface in a cross machine direction and supplying pressurized air, downstream thereof, along at least one further line across the substantially web-wide surface in a cross machine direction, the flow of air forming between the web and the substantially web-wide surface an air layer of reduced static pressure, so as to stabilize the web against flutter.*

*16. An apparatus as claimed in claim 15, wherein*

*(a) scanner equipment for scanning at least one physical property of the web is provided downstream of the one device but upstream of the subsequent device, said scanner equipment having:*

*(aa) a frame with a central opening for the passage therethrough of the web;*

*(ab) a scanner unit for scanning the physical property, which unit is carried by the frame and is movable back and forth across the web from one longitudinal web edge to the other; and*

*(ac) a device associated with the scanner unit for forming a surface supporting the web at locations between the scanner unit and the two longitudinal web edges during the passage of the web through the opening;*

*(ad) the web supporting surface of the scanner equipment has an upstream edge and a downstream edge; and wherein*

*(b) immediately upstream of the scanner equipment the web transfer device has a trailing end, which is overlapped by the upstream edge of the scanner equipment web supporting surface, and immediately downstream of the scanner equipment the web transfer device has a new leading end, which overlaps the downstream edge of the scanner equipment web supporting surface.*

*17. An apparatus as claimed in claim 15, further comprising a second pressurized air supply for supplying air at a pressure higher than the first pressure at a plurality of locations along the web transfer device so as to pneumatically convey a paper tail, formed by slitting of the web, from the one device to the subsequent device.*

*18. An apparatus as claimed in claim 15, including a calender having a nip for calendering the web provided downstream of the one device but upstream of the subsequent device, and wherein the web transfer device has a trailing end immediately upstream of the calender nip and a new leading end immediately downstream of the calender nip.*

*19. An apparatus as claimed in claim 15, wherein the web transfer device includes a series of consecutive substantially web-wide plate members, each plate member having an upstream end and a downstream end, the trailing end of at least one of the plate members being located spaced from a neighboring one of the plate members so as to form an opening between the plate members for the passage of air therethrough, the pressurized air supply including a pipe member extending along and bridging the opening, the pipe member having an elongate passage for discharging the flow of air.*

*20. An apparatus as claimed in claim 19, wherein the plate members are substantially planar and wherein a plate member forms an obtuse angle with a neighboring plate member.*

*21. An apparatus as claimed in claim 19, wherein at least one of the plate members has at least one transverse step so as to cause a sudden increase in a distance from the predetermined run of the web to the plate member as the web runs from the first device to the subsequent device.*

*22. An apparatus for transferring an essentially endless ready-dried fibrous web from one device and along a predetermined run to a subsequent device for performing an act or operation on the web, which comprises:*

*(a) a series of substantially web-wide plate members each defining a substantially web-wide surface having an upstream end and a shape conforming to at least a portion of the predetermined run and extending sub-*

*stantially all the way from one device to the subsequent device and facing a surface of the web, each plate member having a leading end and a trailing end, the trailing end of at least one of the plate members being located spaced from a neighboring one of the plate members so as to form an opening between the plate members for the passage of air therethrough, and*

(*b*) *a pressurized air supply for creating a flow of air that flows substantially in the downstream direction of the web run, said pressurized air supply supplying pressurized air along a first line across the fibrous web and supplying pressurized air, downstream thereof, along a second line across the fibrous web between neighboring plate members, the flow of air forming adjacent the web an air layer of reduced static pressure, so as to stabilize the web against flutter.*

*23. An apparatus as claimed in claim 22, including at least three plate members each having a leading end and a trailing end at least one of which is located spaced from a neighboring plate member so as to form at least two openings between the plate members for the passage of air therethrough.*

*24. An apparatus as claimed in claim 23, wherein the one device includes a yankee dryer, from which the web is creped off by means of a creping blade to form a creped web, and the leading end of a first plate member starts at the creping blade.*

*25. An apparatus as claimed in claim 23, wherein means are provided for removing a suspension of dust in air passing through at least one of the openings.*

*26. An apparatus as claimed in claim 22, wherein the trailing end of one plate member is located at a larger distance from the predetermined run of the web than the distance from the leading end of a neighboring downstream plate member to the predetermined run of the web.*

* * * * *